United States Patent
Han

(10) Patent No.: US 9,677,949 B1
(45) Date of Patent: Jun. 13, 2017

(54) FIBER-OPTIC SENSOR FOR STRAIN-INSENSITIVE TEMPERATURE MEASUREMENTS

(71) Applicant: The Board of Regents of the University of Nebraska, Lincoln, NE (US)

(72) Inventor: Ming Han, Lincoln, NE (US)

(73) Assignee: NUTECH VENTURES, Lincoln, NE (US)

( * ) Notice: Subject to any disclaimer, the term of this patent is extended or adjusted under 35 U.S.C. 154(b) by 406 days.

(21) Appl. No.: 14/526,168

(22) Filed: Oct. 28, 2014

Related U.S. Application Data

(60) Provisional application No. 61/896,704, filed on Oct. 29, 2013.

(51) Int. Cl.
| | |
|---|---|
| *G01K 11/32* | (2006.01) |
| *G01K 1/26* | (2006.01) |
| *G01K 11/12* | (2006.01) |
| *G01J 3/45* | (2006.01) |

(52) U.S. Cl.
CPC ............ *G01K 11/3206* (2013.01); *G01J 3/45* (2013.01); *G01K 1/26* (2013.01); *G01K 11/125* (2013.01)

(58) Field of Classification Search
CPC ................................................ G01K 11/3206
See application file for complete search history.

(56) References Cited

U.S. PATENT DOCUMENTS

| | | | | |
|---|---|---|---|---|
| 4,945,230 A | * | 7/1990 | Saaski | G01D 5/268 250/226 |
| 2014/0327979 A1 | * | 11/2014 | Englander | B60R 1/0605 359/841 |

OTHER PUBLICATIONS

Lu et al, "Fiber-Optic Temperature Sensor Using a Fabry-Perot Cavity Filled With Gas of Variable Pressure", IEEE Photonics Technology Letters, vol. 26 No. 8, Apr. 15, 2014.*

* cited by examiner

*Primary Examiner* — Minh Phan
*Assistant Examiner* — Leon W Rhodes, Jr.
(74) *Attorney, Agent, or Firm* — Daniel J. Honz; Advent, LLP

(57) ABSTRACT

An in-line fiber-optic temperature sensor is disclosed. In an implementation, the in-line fiber-optic temperature sensor includes an optically transmissive fiber, a reflector, a microstructured fiber defining a channel therein for receiving a fluid, and a Fabry-Perot cavity in fluid communication with the microstructured fiber. The microstructured fiber can be retained between the optically transmissive fiber and the reflector. The Fabry-Perot cavity defined by a material and configured to receive a gas having an index of refraction that changes in a known way with temperature and pressure changes in fluid communication with the channel of the microstructured fiber. The in-line fiber-optic temperature sensor also includes a chamber defined between the optically transmissive fiber and the microstructured fiber for connecting in fluid communication with a vacuum/pressure source for changing pressure. The in-line fiber-optic temperature sensor also includes a sensor for determining an optical interferometric reflection spectrum associated with the Fabry-Perot cavity.

20 Claims, 8 Drawing Sheets

FIBER-OPTIC SENSOR FOR STRAIN-INSENSITIVE TEMPERATURE MEASUREMENTS

CROSS-REFERENCE TO RELATED APPLICATIONS

The present application claims the benefit under 35 U.S.C. §119(e) of U.S. Provisional Application Ser. No. 61/896,704, entitled FIBER-OPTIC SENSORS FOR TEMPERATURE MEASUREMENT FROM CRYOGENIC TO ABOVE 1000° C., filed on Oct. 29, 2013, which is hereby incorporated by reference in its entirety.

FEDERALLY SPONSORED RESEARCH OR DEVELOPMENT

This invention was made with government support under contract N00014-13-1-0159 to support the United States Navy and the Office of Naval Research. The government has certain rights in the invention.

BACKGROUND

Fiber-optic sensors, such as intrinsic sensors, utilize optical fibers to measure temperature, strain, pressure, and/or other characteristics associated with the optical fiber. For example, the optical fiber may be modified such that the characteristic to be measured modulates the intensity, phase, polarization, wavelength, and/or transit time of the light within the fiber. A portion of the modulation can be measured to determine the characteristic to be measured.

SUMMARY

An in-line fiber-optic temperature sensor is disclosed. In an implementation, the in-line fiber-optic temperature sensor includes an optically transmissive fiber, a reflector, a microstructured fiber, and a Fabry-Perot cavity that receives a gas through a fluid channel in the microstructure fiber. The gas material within the Fabry-Perot cavity has an index of refraction that changes in a known way with temperature and pressure changes in fluid communication with the channel of the microstructured fiber. The in-line fiber-optic temperature sensor also includes a chamber defined between the optically transmissive fiber and the microstructured fiber for connecting in fluid communication with a vacuum/pressure source for changing pressure. The in-line fiber-optic temperature sensor also includes a sensor for determining an optical interferometric reflection spectrum associated with the Fabry-Perot cavity. The pressure within the Fabry-Perot cavity can be selectively adjusted via the vacuum/pressure source to facilitate measurements of the index of refraction at multiple pressures to facilitate determination of a temperature associated with the Fabry-Perot cavity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Figure 1:
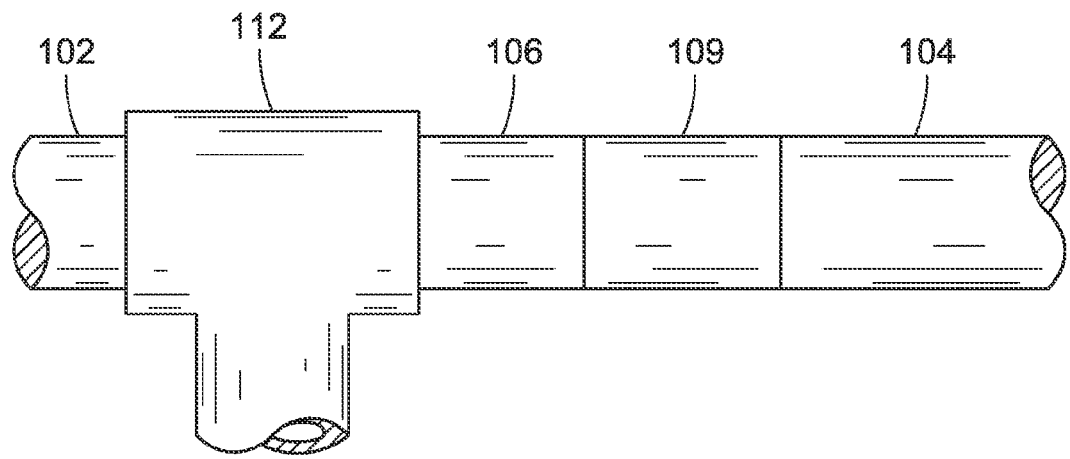
FIG. 1 is a perspective partial side view of an in-line optical sensor in accordance with an example implementation of the present disclosure.
Figure 2:
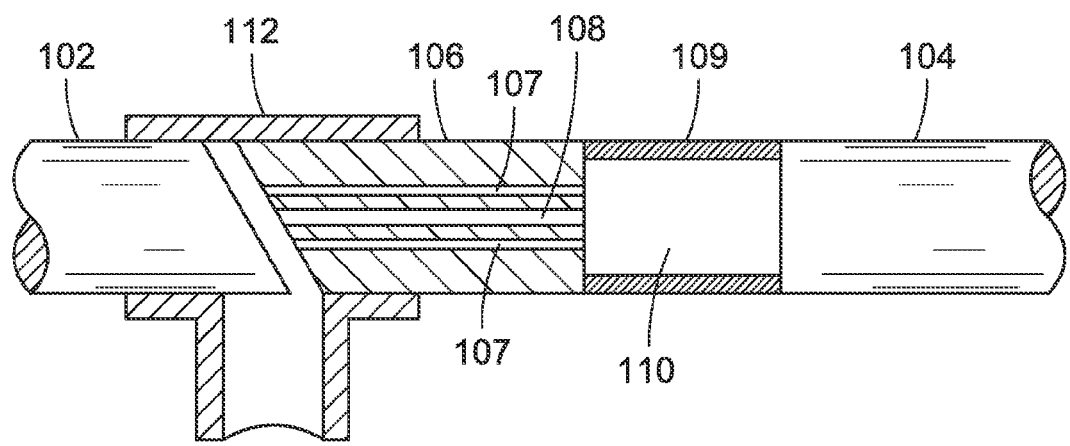
FIG. 2 is a perspective partial cross-sectional view of an in-line optical sensor in accordance with an example implementation of the present disclosure.
Figure 3:
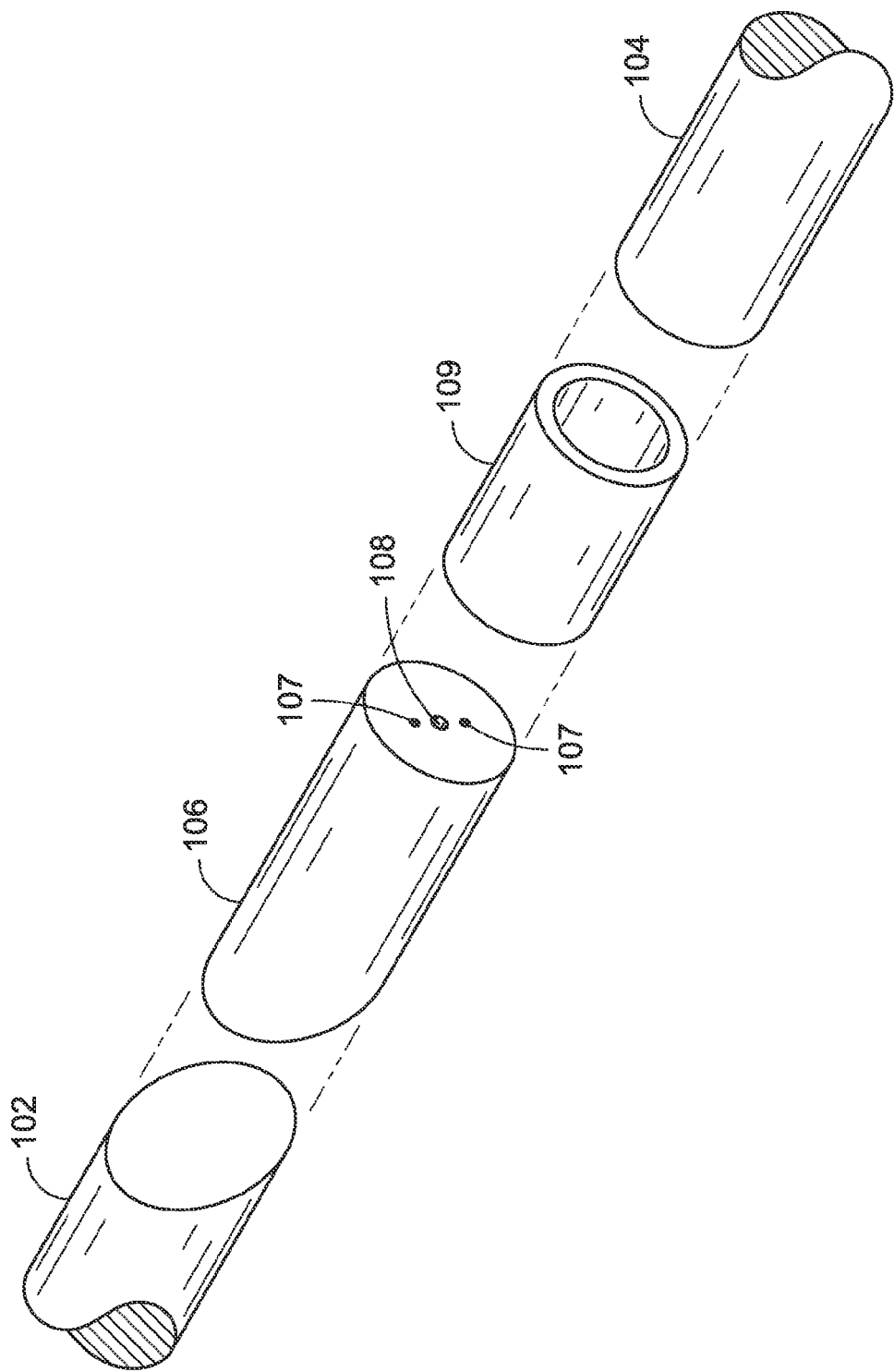
FIG. 3 is a perspective partial exploded isometric view of an in-line optical sensor in accordance with an example implementation of the present disclosure.
Figure 4:
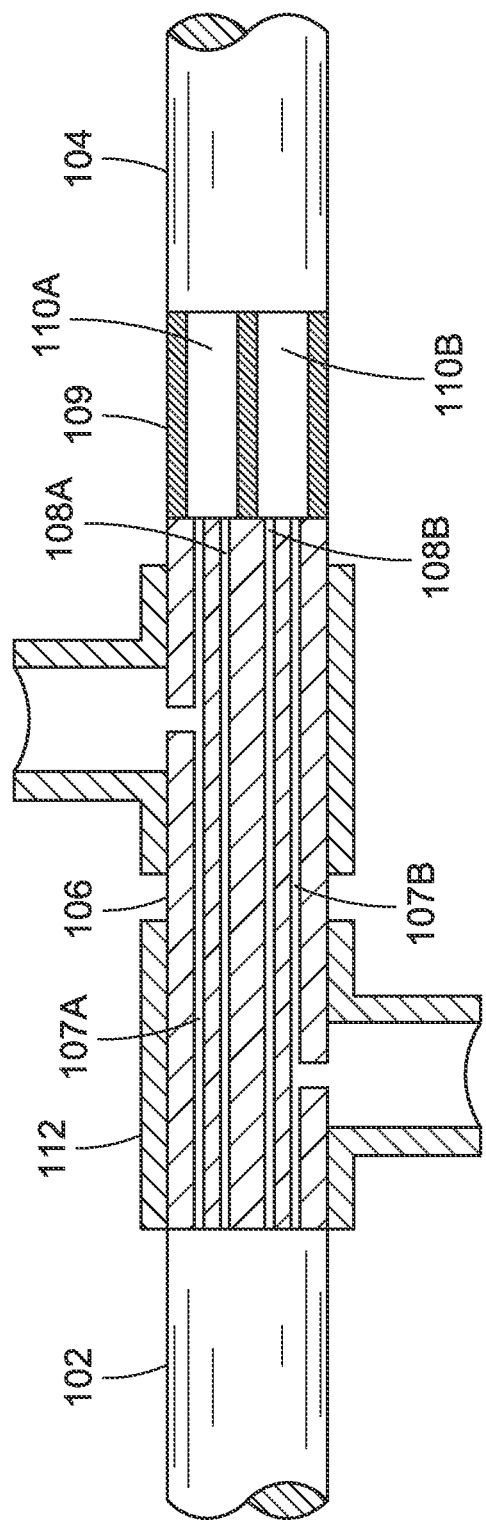
FIG. 4 is a perspective partial cross-sectional view of an in-line optical sensor in accordance with another example implementation of the present disclosure.

FIGS. 1 through 7 illustrate an example in-line fiber-optic sensor 100 configured for strain-insensitive temperature measurements in accordance with an example implementation of the present disclosure. In an implementation, as shown in FIGS. 1 through 5, the in-line fiber-optic sensor 100 includes an optically transmissive fiber 102 and a reflector 104. In one or more implementations, the optically transmissive fiber 102 and the reflector 104 may comprise a single-mode fiber (SMF). The reflector 104 may also comprise a suitable material that provides optical reflective characteristics. The in-line fiber-optic sensor 100 also includes a microstructure fiber 106 that defines one or more fluid channels 107 therein to allow for gas movement. The microstructured fiber 106 also defines one or more optical channels 108 (e.g., cores) therein. For example, the optical channels 108 may be arranged to provide light guiding through the microstructure fiber 106. In an implementation, as shown in FIG. 4, the microstructured fiber 106 may define a first channel 108A and a second channel 108B. The microstructured fiber 106 is retained (e.g., disposed) between the optically transmissive fiber 102 and the reflector 104.

As shown, the fiber-optic sensor 100 also includes a material 109 defining a Fabry-Perot cavity 110 that is in fluid communication with the fluid channels 107 and in optical communication with the optical channels 108 of the microstructure fiber 106. For example, the Fabry-Perot cavity 110 may contain a gas that provides a defined index of refraction that changes in a known way with respect to temperature and pressure changes. In an implementation, the material 109 defining the Fabry-Perot cavity 110 may be defined by a fused-silica tube portion. In another implementation, the material 109 defining the Fabry-Perot cavity 110 may be defined by a single crystal sapphire tube portion. However, it is contemplated that other suitable materials may be utilized that provides containment to the gas material in the Fabry-Perot cavity 110. As shown in FIG. 4, the material 109 may define a first Fabry-Perot cavity 110A that is in fluid communication with the first fluid channel 107A and in optical communication with the first optical channel 108A and may define a second Fabry-Perot cavity 110B that is in fluid communication with the second fluid channel 108B and in optical communication with the second optical channel 108B.

The fiber-optic sensor 100 includes a chamber 112 that is defined between the optically transmissive fiber 102 and the microstructured fiber 106 for connecting the microstructured fiber 106 (and the optically transmissive fiber 102) with a vacuum/pressure source 116A. The vacuum/pressure source 116A is configured to selectively adjust the pressure to selectively pressurize the Fabry-Perot cavity 110 by way of the channels 107. In an implementation, the chamber 112 may comprise a three-way pipeline connector.

As shown, the fiber-optic sensor 100 includes a sensor 114 for determining an optical interferometric reflection spectrum associated with the Fabry-Perot cavity 110. The pressure within the Fabry-Perot cavity 110 can be selectively adjusted by way of the vacuum/pressure source 116 to facilitate measurement of the reflection spectrum at a number of pressures to facilitate determination of a temperature associated with the Fabry-Perot cavity 110.

The ends of the microstructured fiber 106 may be cleaved and/or spliced with the material 109 to serve as one of the reflectors for the Fabry-Perot cavity 110. In an implementation, the adjacent ends of the optically transmissive fiber 102 and the microstructured fiber 106 may be cleaved at an angle of approximately eight degrees (8°) to avoid the undesirable reflections that may interfere with the signals from the Fabry-Perot cavity 110.

Figure 7:
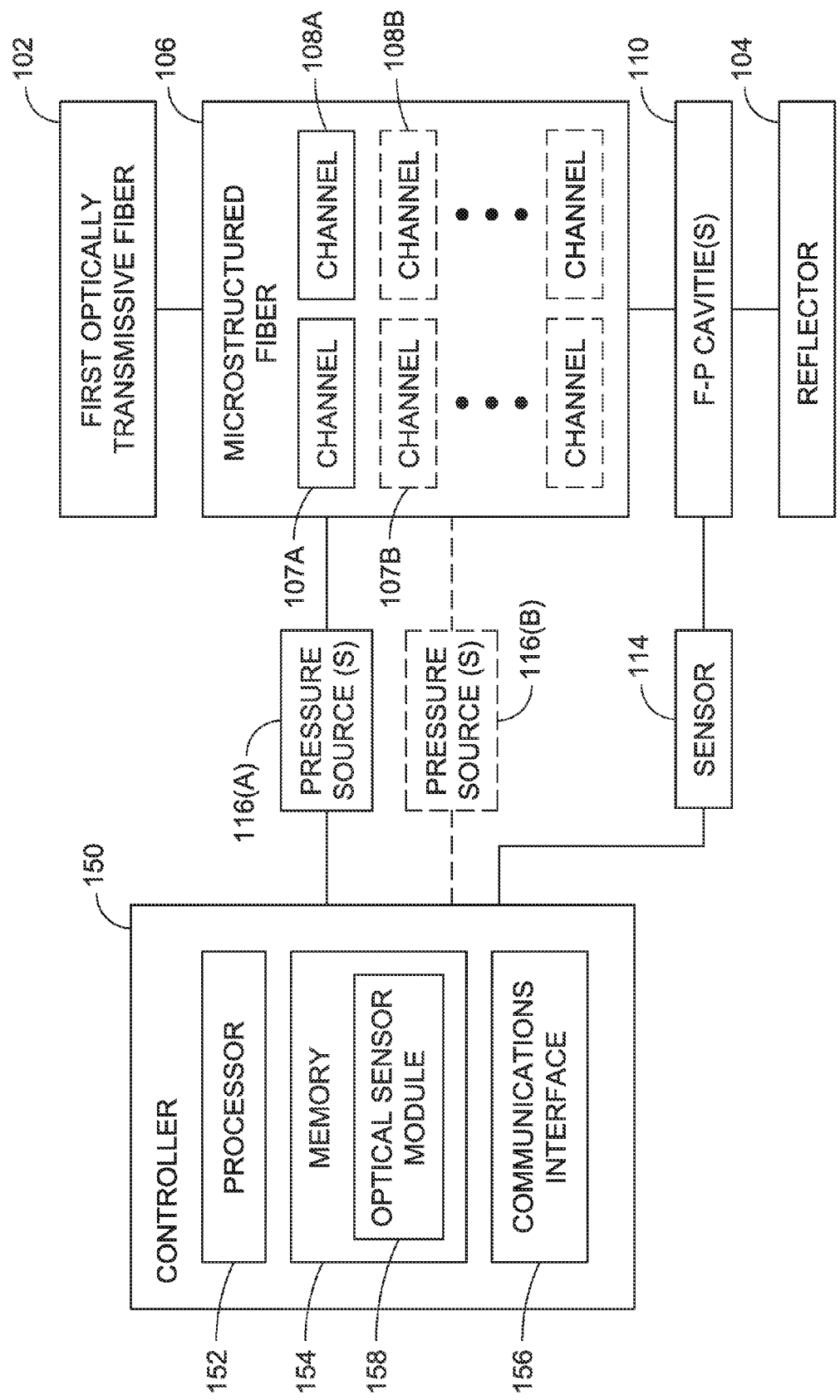
FIG. 7 is a block diagram illustrating the in-line optical sensor in accordance with an example implementation of the present disclosure.

FIG. 7 illustrates a controller 150 that is configured to determine the temperature associated with the Fabry-Perot cavity 110 (or cavities 110A, 110B). The controller 150 may be configured in a variety of ways. The controller 150 is illustrated as including a processor 152, a memory 154, and a communication interface 156. The processor 152 provides processing functionality for the test system 100 and may include any number of processors, micro-controllers, or other processing systems, and resident or external memory for storing data and other information accessed or generated by the test system 100. The processor 152 may execute one or more software programs that implement the techniques and modules described herein. The processor 152 is not limited by the materials from which it is formed or the processing mechanisms employed therein and, as such, may be implemented via semiconductor(s) and/or transistors (e.g., electronic integrated circuits (ICs)), and so forth.

The memory 154 is an example of a non-transitory computer storage device that provides storage functionality to store various data associated with the operation of the test system, such as the software program and code segments mentioned above, computer instructions, and/or other data to instruct the processor 152 and other elements of the test system 800 to perform the techniques described herein. Although a single memory 154 is shown, a wide variety of types and combinations of memory may be employed. The memory 154 may be integral with the processor 152, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth.

The communications interface 156 is operatively configured to communicate with components of the sensor 100. For example, the communications interface 156 can be configured to transmit data for storage in the sensor 100, retrieve data from storage in the sensor 100, and so forth. The communications interface 156 is also communicatively coupled with the processor 152 to facilitate data transfer between components of the sensor 100 and the processor 152 (e.g., for communicating inputs to the processor 152 received from a device communicatively coupled with the sensor 100). It should be noted that while the communications interface 156 is described as a component of a system 100, one or more components of the communications interface 156 can be implemented as external components communicatively coupled to the sensor 100 via a wired and/or wireless connection. The sensor 100 can also comprise and/or connect to one or more input/output (I/O) devices (e.g., via the communications interface 156) including, but not necessarily limited to: a display, a mouse, a touchpad, a keyboard, and so on.

The communications interface 156 and/or the processor 152 can be configured to communicate with a variety of different networks including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to be restrictive of the present disclosure. Further, the communications interface 156 can be configured to communicate with a single network or multiple networks across different access points.

The controller 150 is illustrated as including an optical sensor module 158, which is storable in memory 154 and executable by the processor 152. The optical sensor module 158 represents functionality to control the pressure source(s) 116A (116B) and determine a temperature associated with the Fabry-Perot cavity 110 (or cavities 110A, 110B). For example, as shown in FIG. 7, the sensor 100 may include another vacuum/pressure source 116B for adjusting pressure to selectively pressurize another Fabry-Perot cavity 110B by way of a channel 107B (e.g., the vacuum/pressure source 116A adjusts the pressure to selectively pressurize another Fabry-Perot cavity 110A by way of a channel 107A as shown in FIG. 4). The controller 150 is operatively coupled to the vacuum/pressure source(s) 116A (116B) to cause the vacuum/pressure source 116A, 116B to selectively adjust the pressurize the Fabry-Perot cavity 110 (or cavities 110A, 110B).

In one or more implementations, the optical sensor 100 can determine a temperature that is at least substantially insensitive to strain interferences. The optical sensor 100 can be operated by selectively adjusting the gas pressure within the Fabry-Perot cavity 110 (or cavities) through the channels 107 (or channels 107A, 107B). The sensor 114 is configured to measure and record data representing the optical interferometric reflection spectrum associated with the Fabry-Perot cavity 110 (e.g. the reflection from the Fabry-Perot cavity 110 as a function of wavelength) when the fluid (e.g., gas) inside the Fabry-Perot cavity 110 is at different pressure levels. The controller 150 is configured to determine the wavelength position of a constant-phase point associated with the spectral fringes and to determine a strain-insensitive temperature based upon the absolute wavelength position of the constant-phase point and the slope of the wavelength position versus pressure curve.

In an implementation, the optical sensor module 158 utilizes control logic, the modeling of which is described herein, to determine the temperature associated with the Fabry-Perot cavity 110. The wavelength corresponding to a constant phase on the spectral fringe from the Fabry-Perot cavity 110 (e.g., a fringe valley or peak) is modeled by:

$$2nL = m\lambda \qquad \text{EQN. 1}$$

where m is a constant and λ is the wavelength of constant phase. In this implementation, n and L are, respectively, the RI (refractive index) of air and the Febry-Perot cavity 110 length. Due to the non-ideality of air, the RI of air is a function of its temperature (T), pressure (p), and composition. However, the difference between the air RI and the vacuum RI is proportional to p/T (T in the unit of Kelvin), or can be modeled by $$n - 1 = \gamma p / T \qquad \text{EQN. 2}$$

where γ is a constant having a value that is determined by the gas type. Utilizing EQNS. 1 and 2 yields $$\lambda = \frac{2L}{m}\left(\frac{\gamma}{T}p + 1\right) \qquad \text{EQN. 3}$$

Using EQN. 3, the slope of the λ versus p curve, k, is provided. k is dependent on the temperature. More specifically, assuming that the strain is constant when p is varied and ignoring the small dependence of L on p, $$k \triangleq \frac{\partial \lambda}{\partial p} = \frac{2\gamma L}{mT} \qquad \text{EQN. 4}$$

Note that for gases including air, n≈1 (e.g., n−1≈3×10⁻⁴ for air at standard temperature and pressure) and, from EQN. 1, $$\frac{L}{m} \approx \lambda / 2.$$

Utilizing EQN. 4, the gas temperature associated with the Fabry-Perot cavity 110 can be modeled using $$T = \gamma \lambda / k \qquad \text{EQN. 5}$$

Thus, EQN. 5 shows that the gas temperature is linearly proportional to λ/k, which is obtained from the measured data representing the reflection spectra, with a coefficient, γ, which is determined by the optical property of the gas and is at least substantially independent on the Fabry-Perot cavity 110 length, L. Thus, the temperature measurement based on measuring λ/k is at least substantially independent upon the strain.

Figure 5:
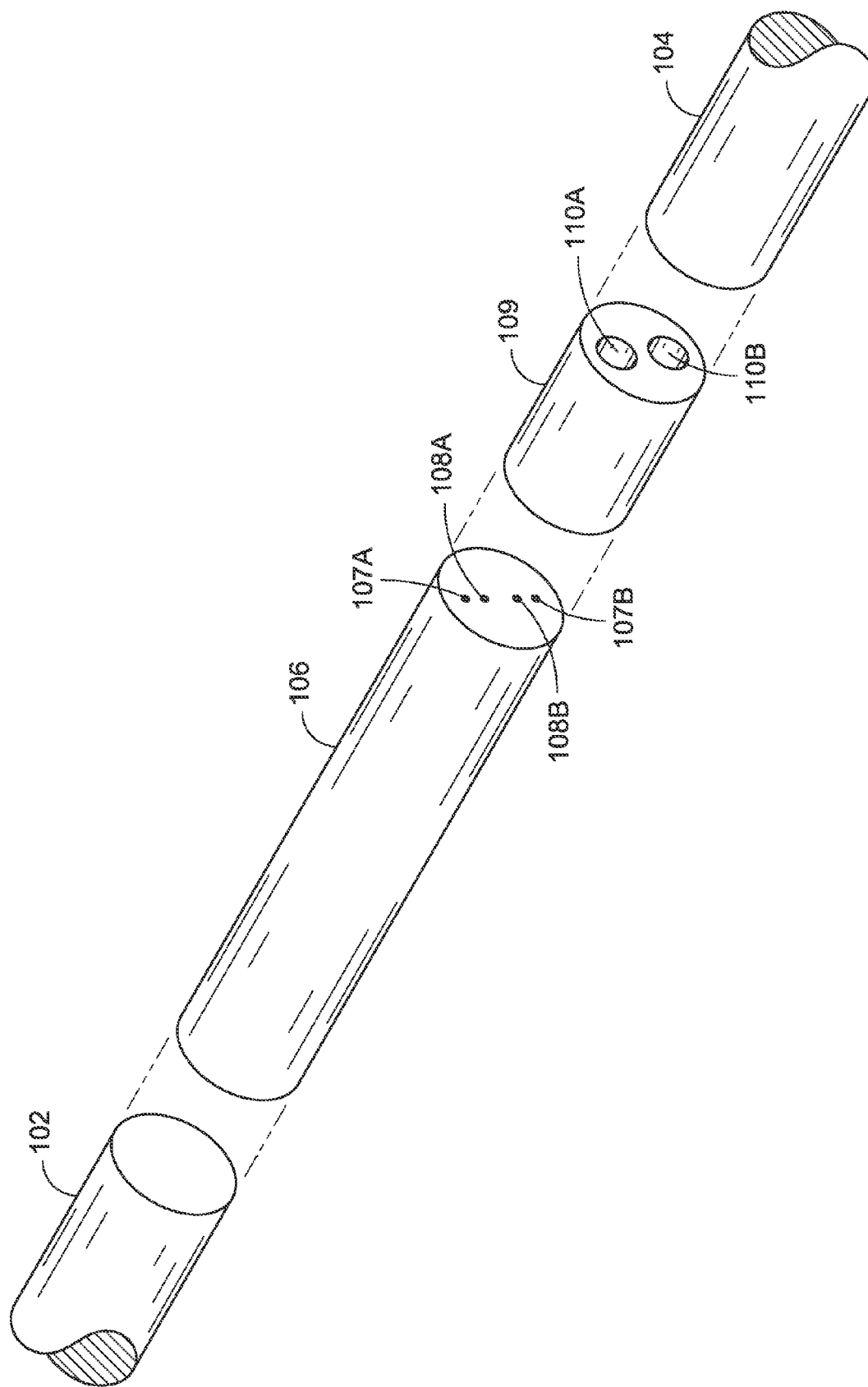
FIG. 5 is a perspective partial exploded isometric view of an in-line optical sensor as shown in FIG. 4.

With respect to the implementation shown in FIGS. 4 and 5, the optical sensor module 158 utilizes control logic based upon modeling as described herein. The sensor 114 is configured to measure the spectral fringes associated with the channels 108A, 108B. For example, each of the Fabry-Perot cavities 110A, 110B can be filled with a fluid, such as gas, having different pressures by way of the channels 107A, 107B. The optical sensor module 158 and the processor 152 are configured to determine the absolute temperature based upon the spectral positions of the fringes for both Fabry-Perot cavities 110A, 110B. It is contemplated that the two Fabry-Perot cavities 110A, 110B do not have to be identical as long as the cavities 110A, 110B experience at least substantially the same strain.

Figure 8A:
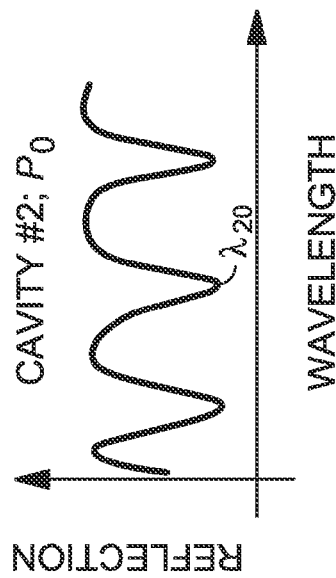
FIG. 8A is an example graph illustrating a measured reflection versus wavelength for a given pressure in a first cavity.
Figure 8B:
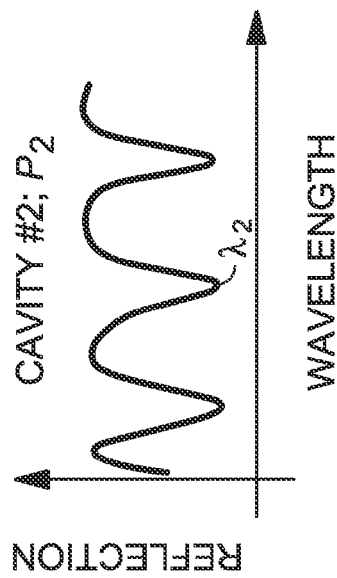
FIG. 8B is an example graph illustrating a measured reflection versus wavelength for the given pressure in a second cavity.

Before pressurization, the spectral fringes of both Fabry-Perot cavities 110A, 110B are measured by the sensor 114, which assumes the gases in both cavities 110A, 110B have the same arbitrary pressure of $P_0$ (see FIGS. 8A and 8B). The controller 150 records the data representing the spectra and the positions of a given fringe for each cavity 110A, 110B (e.g., $\lambda_{10}$ and $\lambda_{20}$ for cavities 110A, 110B, respectively).

Figure 8C:
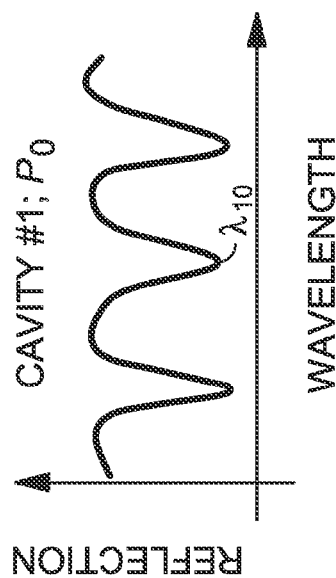
FIG. 8C is an example graph illustrating a measured reflection versus wavelength for a second given pressure in the first cavity.
Figure 8D:
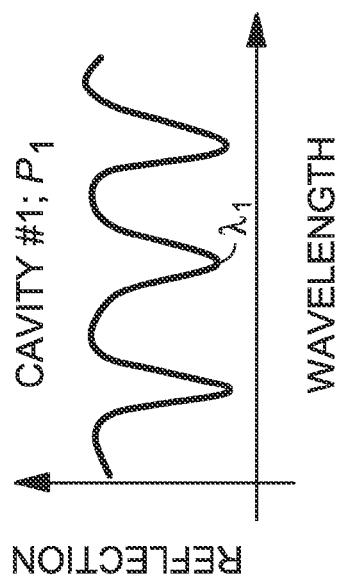
FIG. 8D is an example graph illustrating a measured reflection versus wavelength for a third given pressure in the second cavity.

The controller 150 causes the vacuum/pressure sources 116A, 116B to selectively pressurize the cavities 110A, 110B to different pressure levels (e.g., $P_1$ for cavity 110A and $P_2$ for cavity 110B), and the pressure levels are maintained at these levels (see FIGS. 8C and 8D). For respective measurements, the data representing the spectra associated with the cavity 110A and the cavity 110B are saved in the memory 154. The module 158 is configured to cause the processor 152 to determine the wavelength position of the same fringes of the first spectra (e.g., spectra associated with the cavity 110A) and of the second spectra (e.g., spectra associated with the cavity 110B). For example, the wavelength positions may be identified as $\lambda_1$ for cavity 110A and $\lambda_2$ for cavity 110B. Based upon these determinations, the module 158 can cause the processor 152 to determine the absolute temperature utilizing $$\gamma(P_1 - P_2) = T\left(\frac{\lambda 1 \lambda 20}{\lambda 2 \lambda 10} - 1\right) \qquad \text{EQN. 6}$$

where γ is the gas parameter for determining the gas refractive index versus pressure/temperature.

Figure 6:
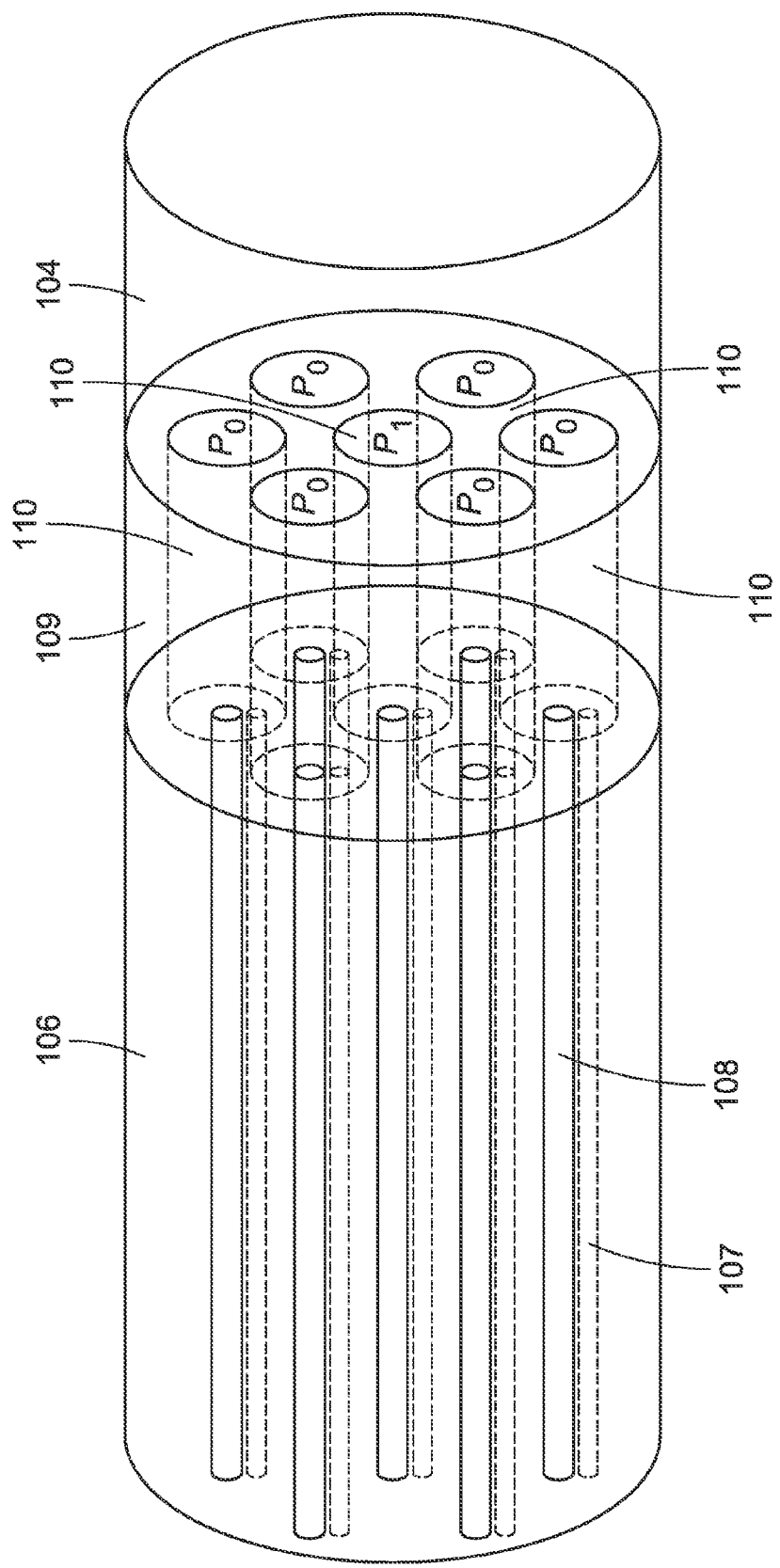
FIG. 6 is a perspective partial isometric view of an in-line optical sensor in accordance with another implementation of the present disclosure.

FIG. 6 illustrates another example implementation of the sensor 100 that includes multiple Fabry-Perot cavities 110 defined within the material 109. In this implementation, a first Fabry-Perot cavity 110 may be selectively pressurized to a first pressure and the other Fabry-Perot cavities 110 may be selectively pressurized to a second pressure that is different from the first pressure. However, it is understood that the other Fabry-Perot cavities 110 may also be selectively pressurized to other pressures (e.g., each Fabry-Perot cavity 110 is pressurized to a different pressure).

Figure 9:
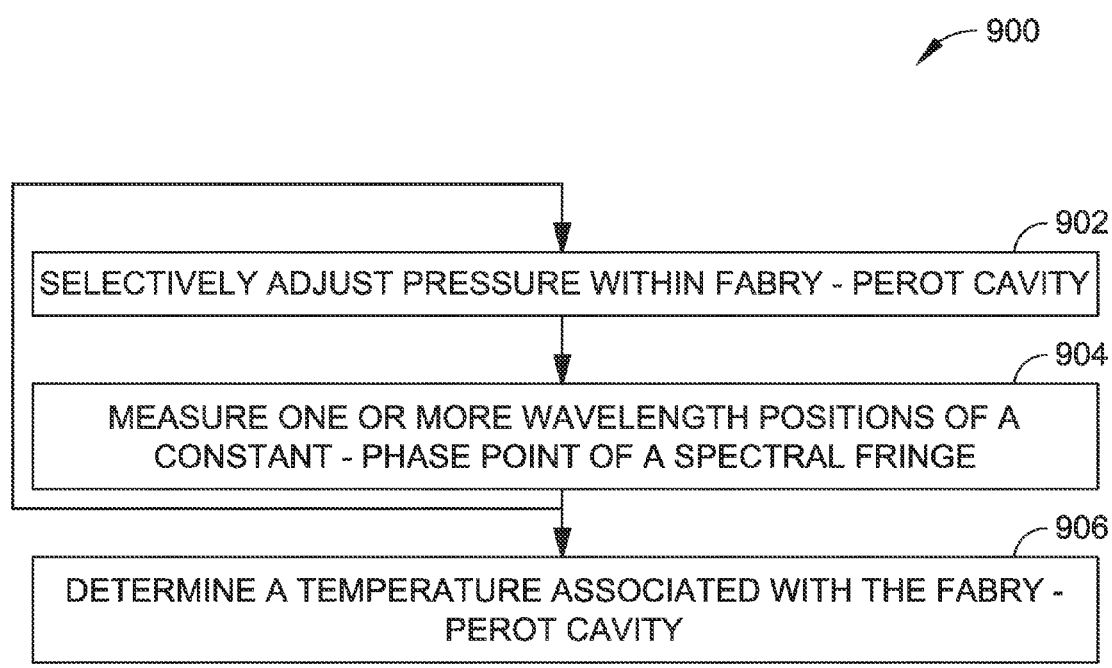
FIG. 9 is a method diagram for determining temperature within an in-line optical sensor in accordance with an example implementation of the present disclosure.

FIG. 9 illustrates an example method 900 for determining a temperature associated with an in-line fiber optic temperature sensor in an example implementation of the present disclosure. As shown in FIG. 9, pressure within a Fabry-Perot cavity is selectively adjusted (Block 902). As discussed above, the vacuum/pressure source 116 is configured to selectively adjust the pressure within the Fabry-Perot cavity 110. For example, as discussed above, the vacuum/pressure source 116 selectively adjusts the pressure within the Fabry-Perot cavity 110 by way of the channel(s) of the microstructured fiber 106. As shown in FIG. 9, one or more wavelength positions of a constant-phase point of a spectral fringe are measured (Block 904). As described above, the sensor 114 measures one or more wavelength positions of a constant-phase point of a spectral fringe (e.g., measuring the wavelength position of a fringe valley or peak) is measured at differing pressures. Processes of selectively adjusting pressure within a Fabry-Cavity (Block 902) and measuring one or more wavelength positions of a constant-phase point of a spectral fringe (Block 904) may be repeated to obtain the necessary data for the determination of the temperature associated with the Fabry-Perot cavity. Data representing the measurements are stored in the memory 154 as a data structure. A temperature associated with the Fabry-Perot cavity is determined (Block 906). In one or more implementations, the controller 150 is configured to determine the absolute temperature associated with the Fabry-Perot cavity 110 utilizing the control logic described above. As discussed in greater detail above, the temperature determination is at least substantially strain-insensitive.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An in-line fiber-optic temperature sensor comprising:
   an optically transmissive fiber;
   a reflector having optical reflective characteristics;
   a microstructured fiber defining at least one fluid channel therein for receiving fluid, the microstructured fiber retained between the optically transmissive fiber and the reflector;
   a Fabry-Perot cavity defined by a material and configured to receive a gas having an index of refraction that changes with temperature and pressure changes in fluid communication with the at least one fluid channel of the microstructured fiber;
   a chamber defined between the optically transmissive fiber and the microstructured fiber for connecting in fluid communication with a vacuum/pressure source for changing pressure; and
   a sensor for determining an optical interferometric reflection spectrum associated with the Fabry-Perot cavity, wherein the pressure in the Fabry-Perot cavity can be selectively adjusted via the vacuum/pressure source to facilitate a plurality of measurements of the reflection spectrum at a plurality of pressures to facilitate determination of a temperature associated with the Fabry-Perot cavity.

2. The in-line fiber optic temperature sensor as recited in claim 1, wherein the Farby-Perot cavity is defined by at least one of a silica tube portion or a sapphire tube portion.

3. The in-line fiber optic temperature sensor as recited in claim 2, wherein the silica tube portion comprises a fused-silica tube portion.

4. The in-line fiber optic temperature sensor as recited in claim 1, wherein the plurality of measurements of the reflection spectrum comprises measuring a wavelength position of a constant-phase point associated with spectral fringes associated with the Fabry-Perot cavity.

5. The in-line fiber optic temperature sensor as recited in claim 1, wherein at least one of the optically transmissive fiber or the reflector comprises a single mode-fiber.

6. The in-line fiber optic temperature sensor as recited in claim 1, wherein the temperature comprises an absolute temperature.

7. The in-line fiber optic temperature sensor as recited in claim 1, wherein the material defines a first Fabry-Perot cavity and a second Fabry-Perot cavity, the first Fabry-Perot cavity in fluid communication with a first channel of the at least one channel and the second Fabry-Perot cavity in fluid communication with a second channel of the at least one channel.

8. A system comprising:
   in-line fiber optic temperature sensor comprising:
   an optically transmissive fiber;
   a reflector having optical reflective characteristics;
   a microstructured fiber defining at least one channel therein for allowing fluid movement, the microstructured fiber retained between the optically transmissive fiber and the reflector;
   a Fabry-Perot cavity defined by a material, the Fabry-Perot cavity configured to receive a gas having an index of refraction that changes with temperature and pressure changes in fluid communication with the at least one fluid channel of the microstructured fiber;
   a chamber defined between the optically transmissive fiber and the microstructured fiber for connecting in fluid communication with a vacuum/pressure source for changing pressure; and
   a sensor for determining an optical interferometric reflection spectrum associated with the Fabry-Perot cavity, wherein the pressure in the Fabry-Perot cavity can be selectively adjusted via the vacuum/pressure source to facilitate a plurality of measurements of a wavelength position of a constant phase point associated with reflection spectral fringes associated with the Fabry-Perot cavity at a plurality of pressures to facilitate determination of a temperature associated with the Fabry-Perot cavity; and
   a controller operatively coupled to the vacuum/pressure source and
   communicatively coupled to the sensor, the controller comprising:
   a memory for storing one or more modules;
   a processor communicatively coupled to the memory, the processor configured to executed the one or more modules to cause the processor to:
   cause the vacuum/pressure source to selectively adjust the pressure within the Fabry-Perot cavity;
   cause the sensor to obtain a plurality of measurements of a reflection spectrum associated with the Fabry-Perot cavity at a plurality of pressures;
   and determine a temperature associated with the Fabry-Perot cavity based upon the plurality of measurements of the reflection spectrum at the plurality of pressures.

9. The system as recited in claim 8, wherein the Farby-Perot cavity is defined by at least one of a silica tube portion or a sapphire tube portion.

10. The system as recited in claim 9, wherein the silica tube portion comprises a fused-silica tube portion.

11. The system as recited in claim 8, wherein the plurality of measurements of the index of refraction comprise measuring a wavelength position of a constant-phase point associated with spectral fringes associated with the Fabry-Perot cavity.

12. The system as recited in claim 8, wherein at least one of the optically transmissive fiber or the reflector comprises a single mode-fiber.

13. The system as recited in claim 8, wherein the temperature comprises an absolute temperature.

14. The system as recited in claim 8, wherein the material defines a first Fabry-Perot cavity and a second Fabry-Perot cavity, the first Fabry-Perot cavity in fluid communication with a first channel of the at least one channel and the second Fabry-Perot cavity in fluid communication with a second channel of the at least one channel.

15. A method comprising:
   causing a vacuum/pressure source to selectively adjust a pressure within a Fabry-Perot cavity, the Fabry-Perot cavity defined by a material having an index of refraction that changes with temperature and pressure changes in fluid communication with at least one channel of a microstructured fiber, the microstructured fiber defining the at least one channel therein for receiving fluid, the microstructured fiber retained between an optically transmissive fiber and a reflector;
   causing a sensor to obtain a plurality of measurements of a reflection spectrum at a plurality of pressures, the reflection spectrum associated with the Fabry-Perot cavity; and
   determining, by way of a controller, a temperature associated with the Fabry-Perot cavity based upon the plurality of measurements of the reflection spectrum at the plurality of pressures.

16. The method as recited in claim 15, wherein the Farby-Perot cavity is defined by at least one of a fused-silica tube portion or a sapphire tube portion.

17. The method as recited in claim 15, wherein the plurality of measurements of the index of refraction comprise measuring a wavelength position of a constant-phase point associated with spectral fringes associated with the Fabry-Perot cavity.

18. The method as recited in claim 15, wherein at least one of the optically transmissive fiber or the reflector comprises a single mode-fiber.

19. The method as recited in claim 15, wherein the temperature comprises an absolute temperature.

20. The method as recited in claim 15, wherein the material defines a first Fabry-Perot cavity and a second Fabry-Perot cavity, the first Fabry-Perot cavity in fluid communication with a first channel of the at least one channel and the second Fabry-Perot cavity in fluid communication with a second channel of the at least one channel.

* * * * *